UNITED STATES PATENT OFFICE.

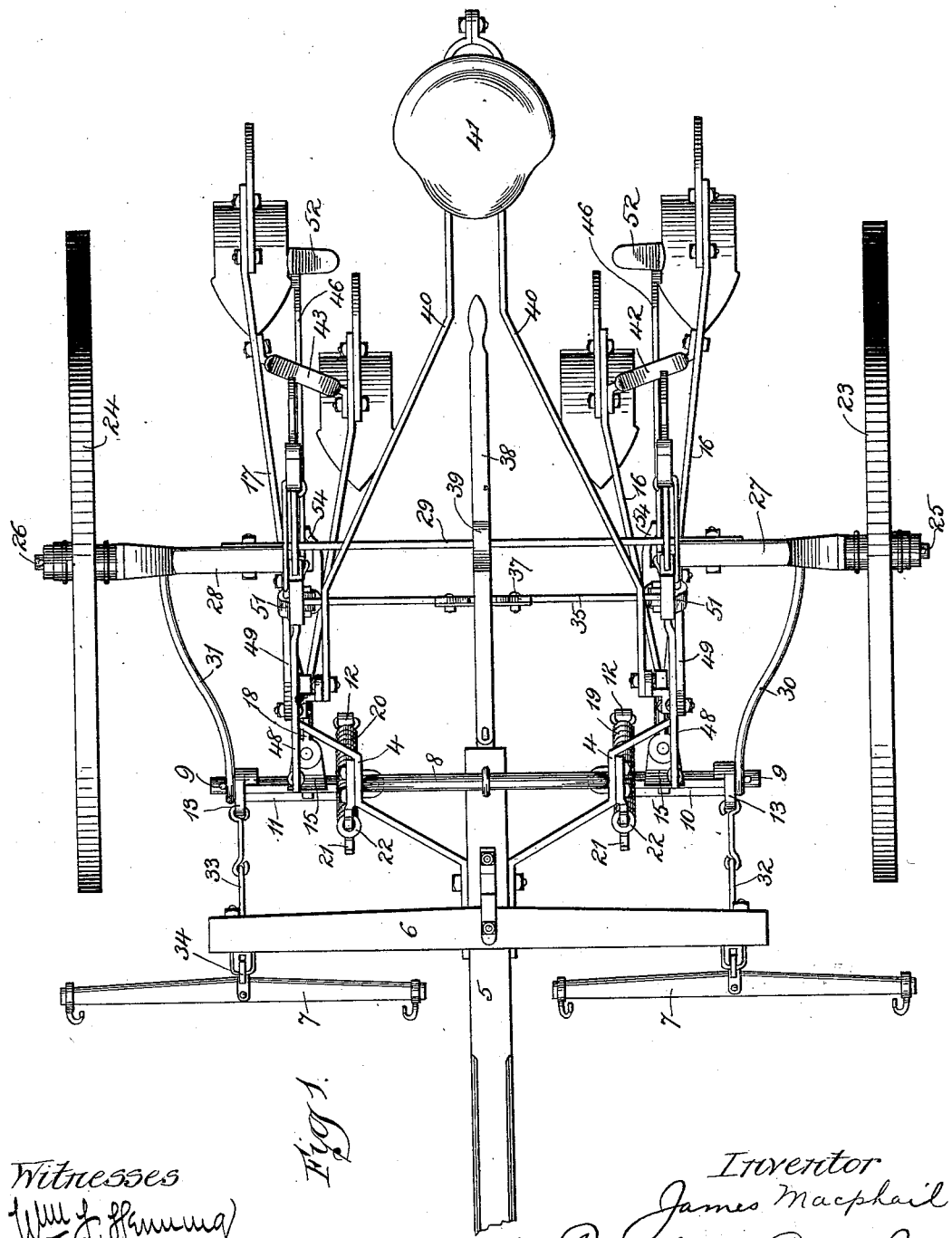

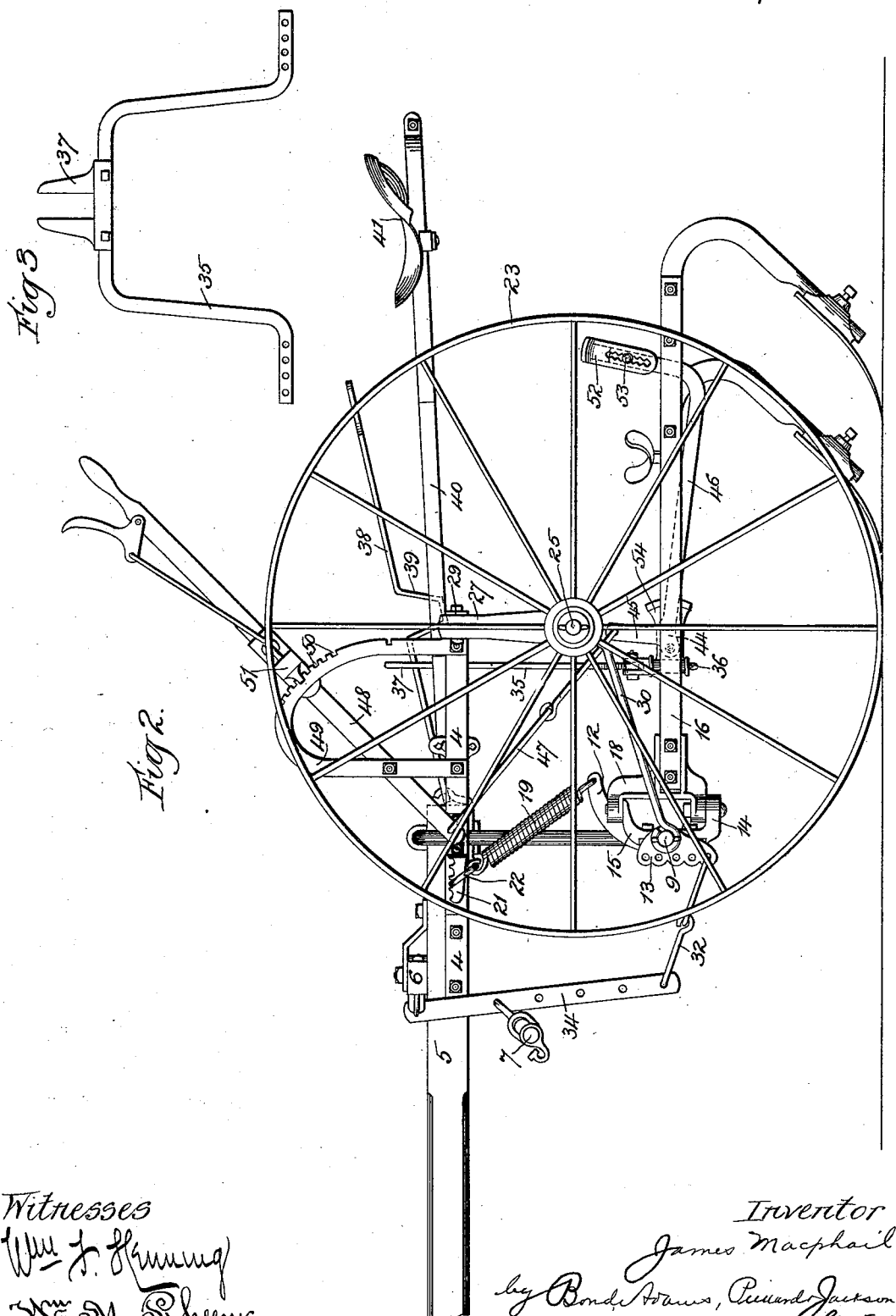

JAMES MACPHAIL, OF ROCKFORD, ASSIGNOR TO ABRAM ELLWOOD, OF DE KALB, ILLINOIS.

CULTIVATOR.

SPECIFICATION forming part of Letters Patent No. 508,434, dated November 14, 1893.

Application filed July 3, 1893. Serial No. 479,514. (No model.)

*To all whom it may concern:*

Be it known that I, JAMES MACPHAIL, a citizen of the United States, residing at Rockford, county of Winnebago, State of Illinois, have invented certain new and useful Improvements in Cultivators, of which the following is a specification, reference being had to the accompanying drawings, in which—

Figure 1 is a top or plan view. Fig. 2 is a side elevation; and Fig. 3 is a detail, showing the connecting yoke.

My invention relates to cultivators, and particularly to wheeled cultivators.

It has for its object to provide certain improved adjustments of the operating parts of the cultivator, whereby the machine may be more readily manipulated and will be better adapted for different kinds of work. I accomplish this object as hereinafter specified and as illustrated in the drawings.

That which I regard as new will be set forth in the claims.

In the drawings,—4 indicates the main frame of the cultivator, which is made of suitable shape to carry the different parts of the machine.

5 indicates the tongue, which is secured to the forward portion of the frame 4, and carries the double-tree 6, as shown in Fig. 2.

7 indicates the single-trees, which are connected to bars 34, which depend from the ends of the double-tree 6, as shown in Fig. 2.

8 indicates an arch, which is secured to the rear end of the tongue 5, and carries at its ends spindles 9, as shown in Fig. 1.

10—11 indicate pipe-boxes or sleeves, which are journaled upon the spindles 9. Each pipe-box 10—11 is provided with an arm 12, which is preferably curved, as shown in Fig. 2, and extends upward and rearward. Each pipe-box is also provided at its outer end with a clevis 13, as shown in the drawings, which is preferably cast integral with the pipe-box.

32—33 indicate links which connect the lower ends of the single-tree carrying bars 34 to the clevises 13.

Each pipe-box is also provided with upper and lower arms 14—15, which form part of the coupling by means of which the cultivator beams are connected to the pipe-boxes.

16—17 indicate cultivator beams.

18 indicates a coupling, one of which is secured to the forward end of each beam 16—17, and is adapted to be connected to the arms 14—15 carried by the pipe-boxes. By this means lateral as well as vertical movement of the cultivator beams is provided for, the vertical movement being secured by journaling the pipe-boxes upon the spindles 9.

19—20 indicate springs, the lower ends of which are connected to the arms 12 of the pipe-boxes, their upper ends being connected to notched plates 21 secured at opposite sides of the frame 4, as shown in Figs. 1 and 2. Each spring 19—20 is provided at its upper end with a ring or hook 22, which is adapted to fit into the notches in the adjacent plate 21; by which construction, by shifting the ring 22 in the notches the tension upon the spring 19 may be adjusted as desired. The springs 19—20 serve to counterbalance, or partially counterbalance, the weight of the cultivator beams and shovels in the usual manner.

23—24 indicate cultivator wheels, which are journaled upon spindles 25—26 carried by arms 27—28 respectively, which are secured to opposite sides of the frame 4.

29 indicates a bracing rod, which connects the opposite arms 27—28, as shown in Fig. 1.

30—31 indicate draft rods, the forward ends of which are connected to the spindles 9, their rear ends being connected to the inner ends of the spindles 25—26.

35 indicates a yoke, the ends of which are adjustably connected to brackets 36 secured to the beams 16—17 a short distance in rear of the beam coupling.

37 indicates a bifurcated casting which is secured to the upper portion of the yoke 35, as shown in Fig. 3.

38 indicates a lever, which is pivoted at its forward end in rear of the tongue 5, and is laterally movable. The lever 38 is adapted to fit into a suitable recess in the casting 37, as shown in Fig. 1, by which construction the cultivator beams may be swung laterally simultaneously by operating the lever 38. In order to provide for holding the lever 38 at a convenient height, it is provided with a downwardly bent portion 39, as shown in Fig. 2, such bent portion being adapted to rest upon the cross-bar 29.

40 indicates a seat-supporting frame, the forward ends of which are secured to the frame 4, which frame 40 extends to the rear of the machine.

41 indicates the seat, which is mounted on the frame 40.

42—43 indicate foot rests, which are secured to the beams of each gang of cultivators. By means of the foot rests 42—43 the operator may move the cultivator gangs laterally independently of the lever 38, said lever being then lifted out of the recess in the casting 37 to permit of such independent lateral movement.

44 indicates a bell crank lever, having arms 45—46, one of which levers is secured to each bracket 36. The arm 45 of the lever 44 extends upward, and is connected by a link 47 to a hand lever 48 pivoted upon a bracket 49. The bracket 49 is provided with a series of notches 50, and the lever 48 is provided with the usual locking dog 51. The arm 46 of the lever 44 extends rearward and is provided with an adjustable foot rest 52. The foot rest 52 is secured to the upturned rear end of the arm 46, by a bolt 53 which passes through the arm 46 and is adapted to fit into a series of notches in the foot rest 52. By loosening the bolt 53, any desired vertical adjustment of the foot rest 52 may be made. The lever 48 being locked, by depressing the foot lever 46 the corresponding cultivator gang may be lifted, or by holding the foot lever stationary the cultivator gangs can be lifted or depressed by operating the hand lever 51.

54 indicates guides formed by extending a portion of the brackets 36 rearward beside the levers 46, which guides serve to prevent displacement of the levers 46.

That which I claim as my invention, and desire to secure by Letters Patent, is—

1. In a cultivator, the combination with a carriage, and a cultivator beam supported thereby, of a bracket 36 secured to the beam, a bell-crank lever 44 mounted on the bracket and having upwardly and rearwardly projecting arms 45 and 46, a pivoted lever 48, a link 47, connecting said pivoted lever with the upwardly projecting arm of the bell-crank lever, and a foot-rest 52 carried by the rearwardly projecting arm of the bell-crank lever, substantially as described.

2. In a cultivator, the combination with a carriage and pivoted laterally swinging cultivator beams supported thereby, of brackets 36 secured to the beams, a yoke 37 attached at its ends to the brackets, and a pivoted swinging lever 38 engaging the upper bowed part of the yoke for moving it toward either side of the cultivator and simultaneously shifting the beams laterally, substantially as described.

3. In a cultivator, the combination with a carriage, and pivoted laterally swinging cultivator beams supported thereby, of brackets 36 secured to the beams, a bell-crank lever 44 having arms 45 and 46 mounted on the brackets, a yoke 37 attached at its ends to the brackets, a pivoted swinging lever 38 engaging the upper bowed part of the yoke for shifting it laterally in either direction, a lever 48 connected with one arm of the said bell-crank lever, and a foot-rest 52 carried by the other arm of said bell-crank lever, substantially as described.

4. In a cultivator, the combination with a carriage, and a cultivator beam supported thereby, of a bell crank lever 44 pivotally supported by said cultivator beam and having arms 45—46, foot rest 52, means for vertically adjusting said foot rest, lever 48, devices connecting said lever 48 to said arm 45, and locking devices for said lever 48, substantially as described.

5. In a cultivator, the combination with a carriage, and a cultivator beam supported thereby, of a bracket 36 secured to the beam, a bell crank lever 44 having upwardly and rearwardly projecting arms 45 and 46 and mounted on the said bracket, a pivoted lever 48, a link 47 connecting said pivoted lever with the upwardly projecting arm of the bell-crank lever, and a foot-rest 52 vertically adjustable upon the rearwardly projecting arm of the bell-crank lever, substantially as described.

6. In a cultivator, the combination with an arch 8 having spindles 9, and pipe boxes 10 and 11 mounted on the spindles and each having an arm 12 and clevis 13, of plates 21 having a series of notches, and springs 19 having one end secured to said arms of the pipe boxes and the other end provided with rings 22 adjustable in any of the notches in said notched plate, substantially as described.

7. In a cultivator, the combination with a carriage, of cultivator beams arranged at opposite sides thereof, said beams being laterally movable, yoke 35 connecting said cultivator beams, a hand lever 38 adapted to be operated to shift said yoke laterally, means for throwing said lever out of operative position, and foot rests carried by said beams, whereby they may be laterally adjusted by foot power, substantially as described.

8. In a cultivator, the combination with a carriage, and cultivator beams supported thereby, of brackets 36 secured to the cultivator beams, a yoke 35 having its ends secured to said brackets and provided at its upper bowed portion with a bifurcated portion 37, and a pivoted lever 38 engaging the bifurcated portion of the yoke for shifting the latter to either side of the machine, substantially as described.

JAMES MACPHAIL.

Witnesses:
S. M. HUNT,
F. W. SMITH.